(12) United States Patent
Motamedi et al.

(10) Patent No.: US 6,804,059 B2
(45) Date of Patent: Oct. 12, 2004

(54) WIDE-BAND TUNABLE OPTICAL FILTER USING ELECTROHOLOGRAMS WRITTEN INTO PHOTOREFRACTIVE CRYSTALS

(75) Inventors: Ali R. Motamedi, Los Altos, CA (US); Douglas M. Baney, Los Altos, CA (US); Jeffrey N. Miller, Los Altos Hills, CA (US); Marshall T. Depue, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 144 days.

(21) Appl. No.: 10/033,201

(22) Filed: Dec. 27, 2001

(65) Prior Publication Data

US 2003/0123115 A1 Jul. 3, 2003

(51) Int. Cl.[7] .................................................. G02B 5/18
(52) U.S. Cl. ........................ 359/573; 359/578; 359/589
(58) Field of Search ................................ 359/566, 568, 359/573, 578, 589, 15; 385/16, 17, 18, 37

(56) References Cited

U.S. PATENT DOCUMENTS

| | | | |
|---|---|---|---|
| 5,614,129 A | | 3/1997 | Hofmeister et al. |
| 5,640,256 A | * | 6/1997 | De Vre et al. .................. 359/3 |
| 5,712,717 A | * | 1/1998 | Hamel et al. ................. 398/85 |
| 6,256,428 B1 | | 7/2001 | Norwood et al. |
| 6,426,811 B1 | * | 7/2002 | Popovich et al. ............. 359/15 |

FOREIGN PATENT DOCUMENTS

| | | |
|---|---|---|
| WO | WO 00/02098 | 1/2000 |
| WO | WO 01/07946 | 2/2001 |

OTHER PUBLICATIONS

Pesach, E. Refaeli, and A.J. Agranat, " Investigation of the holographic storage capacity of paraelectric K1–xLixTa1–yNbyO3:Cu,V," Optics Letters, vol. 23, No. 8, pp. 642–644, Apr. 15, 1998.
Rakuljic, G.A. and V. Leyva, " Volume holographic narrow–band optical filter," Optics Leters, vol. 18, No. 6, pp. 459–461, Mar. 15, 1993.
Agranat, A.J., V. Leyva, and A. Yariv, " Voltage–controlled photorefractive effect in paraelectric Ktal–xNbxO3:Cu, V," Optics Letters, vol. 14, No. 18, pp. 1017–1019, 9,15,1989.
Balberg, M., M. Razvag, E. Refaeli, and A.J. Agranat, " Electric–field multiplexing of volume holograms in paraelectric crystals," Applied Optics, vol. 37, No. 5, pp. 841–847, Feb. 10, 1998.
Kewitsch, A., M. Segev, A. Yariv, and R.R. Neurganokar, " Electric–field multiplexing/demultiplexing of volume holograms in photorefractive media," Optics Letters, vol. 18, No. 7, pp. 534–536, Apr. 1, 1993.
Agranat, A., R. Hofmeister, and A. Yariv, " Characterization of a new photorefractive material: K1–yLyT1–xNx," Optics Letters, vol. 17, No. 10, pp. 713–715, May 15, 1992.

* cited by examiner

Primary Examiner—Mark A. Robinson
Assistant Examiner—Alessandro Amari

(57) ABSTRACT

A tunable optical filter utilizes multiple electroholographic (EH) gratings with different center wavelengths to filter an optical signal over a wide wavelength range. The EH gratings are connected such that an input optical signal passes through at least one of the EH gratings. The EH gratings are activated and tuned by electrode pairs that are controlled through a voltage controller. The tunable optical filter is coarse tuned by activating the EH gratings having a wavelength range that includes the center wavelength that is to be filtered and fine tuned by adjusting the voltage that is applied across the activated EH gratings.

17 Claims, 8 Drawing Sheets

| Control Matrix | | | |
|---|---|---|---|
| Controller State | | | Wavelength Output |
| $V_1$ | $V_2$ ... | $V_N$ | |
| OFF | OFF | OFF | NONE |
| ON | OFF | OFF | $\lambda_2$ |
| OFF | ON | OFF | $\lambda_2$ |
| ON | OFF | ON | $\lambda_1, \lambda_N$ |
| ON | ON | ON | $\lambda_1, \lambda_2, \lambda_N$ |

WIDE-BAND TUNABLE OPTICAL FILTER USING ELECTROHOLOGRAMS WRITTEN INTO PHOTOREFRACTIVE CRYSTALS

FIELD OF THE INVENTION

The invention relates to tunable optical filters for optical communications systems, and more particularly to a tunable optical filter that utilizes electroholographic filter elements.

BACKGROUND OF THE INVENTION

The desire to transmit more information over optical fibers has led to the multiplexing of multiple optical carriers at different wavelengths into the same optical fiber (wavelength division multiplexing (WDM)). Improved optical sources have enabled the generation of optical carriers with narrower bandwidths, which in turn has allowed more optical carriers to be multiplexed into the same optical fiber. As the number of multiplexed optical carriers increases, there is a need for tunable optical filters that can be adjusted to isolate specific optical carriers from a WDM signal.

Some known tunable optical filters utilize microelectromechanical systems (MEMS) or diffraction gratings to selectively filter out a specific optical carrier. These known MEMS-based and grating-based tunable optical filters utilize mechanically moving parts to tune the filters over a range of wavelengths. Utilizing mechanically moving parts to tune filters makes the filters susceptible to vibration and mechanical failure.

An alternative technique for filtering an optical signal utilizes a volume hologram written into a photorefractive crystal to create a narrow-band optical filter. Utilizing a volume hologram written into a photorefractive crystal to create a narrow-band optical filter is described by George A. Rakuljic and Victor Leyva in "Volume Holographic narrowband optical filter", *Optics Letters*, vol. 18, No. 6 pp. 459–461 (1993). Although writing volume holograms into photorefractive crystals works well to create a filter with a fixed narrow band, a single fixed narrow-band filter does not fulfill the need for wide-band tunable optical filters for use in WDM-based optical communications systems.

Recently, voltage controlled volume holograms written into photorefractive crystals have been incorporated into optical communications devices such as optical switches. Optical switches that incorporate voltage controlled volume holograms written into photorefractive crystals are described in detail in international patent applications published under the Patent Cooperation Treaty (PCT) entitled "Electro-Holographic Optical Switch" (WO 00/02098) and "Electroholographic Wavelength Selective Photonic Switch For WDM Routing" (WO 01/07946).

In general, the principle of operation of photorefractive crystals involves writing a grating pattern into the crystal by establishing a periodic space-charge field. In the paraelectric region, the electro-optic effect is quadratic and is given by:

$$\Delta n = \tfrac{1}{2} n_o^3 g P^2 \qquad (1)$$

where $\Delta n$ is the birefringence, $n_o$ is the refractive index, g is the appropriate electro-optic coefficient, and P is the static polarization. In the linear region, P is given by $P = \in_o (\in -1) E$, where $\in$ is the dielectric constant (which when close to the phase transition follows $\in / \in_o \gg 1$) and where $\in_o$ is the permittivity of a vacuum $8.854 \times 10^{-12}$ F/m. When the interference patterns are written into the crystal using two optical beams, the space-charge fields, $E_{sc}$, that are created are spatially correlated to these patterns. These space-charge fields induce refractive index gratings in the presence of an external electric field, $E_o$, that is given by:

$$\Delta n = \tfrac{1}{2} n_o^3 g \in_o^2 (\in -1)^2 (2 E_o E_{sc} + E_{sc}^2) \qquad (2)$$

where $E_o$ is the externally applied field. It is assumed that the polarization is in the linear region.

The mechanism described with reference to equation (2) provides the ability to selectively activate or de-activate the filtering capability of a photorefractive crystal based on the presence or absence of an external electric field. FIG. 1 depicts a photorefractive crystal 102 with an electroholographic (EH) grating 104 that is activated through a voltage source. When the voltage source is in the "off" state (no voltage applied), the optical signal passes, undiffracted, through the electroholographic grating as indicated by dashed line 106. However, when the voltage source is in the "on" state (voltage applied), the optical signal at the center wavelength of the gratings is diffracted by the grating as indicated by the solid line 108. Because the grating is wavelength specific, only optical signals within the bandwidth of the grating are diffracted.

It is well known in the field of optics that for incident light of wavelength $\lambda$, the response of a grating is given by:

$$d \sin(\theta) = m \lambda_o / 2n \qquad (3)$$

where, d is the spacing between the lines of a grating and $\theta$ is the incident angle of light, m is an integer, n is the index of refraction of the crystal and $\lambda_o$ is the wavelength of the incident light. For a grating with fixed d and $\theta$, any change in the index of refraction results in a variation of the center wavelength of the grating. As described above, the index of refraction of a photorefractive crystal and in turn the center wavelength of the EH grating changes as a function of the externally applied electrical field. For example, a grating written into a material such as strontium barium niobate (SBN):75 can experience as much as 0.5% variation in its index of refraction in the presence of a 330 volts/cm external electric field. For operation around 1,500 nm, a 0.5% variation in the index of refraction allows a grating to be tuned over a range of about 7.5 nm. Although a single electroholographic grating written into a photorefractive crystal can be tuned over a range of about 7.5 nm, WDM communications systems operate over a larger bandwidth, for example, 100 nm and therefore a single filter is not well suited for WDM applications.

In view of the need for tunable optical filters and the problems with mechanically tuned filters, there is a need for a robust tunable optical filter with a tuning range that is compatible with WDM communications systems.

SUMMARY OF THE INVENTION

Multiple electroholographic (EH) gratings with different center wavelengths are utilized to create a tunable optical filter that can be tuned over a wide wavelength range. The EH gratings are connected such that an input optical signal can pass through at least one of the EH gratings. The EH gratings are activated and tuned by electrode pairs that are controlled through a voltage controller. The tunable optical filter is coarse tuned by activating the EH gratings having a wavelength range that includes the center wavelength that is to be filtered and fine tuned by adjusting the voltage that is applied across the activated EH gratings. Because the tunable optical filter is tuned simply by the application and adjustment of voltage across EH gratings, the tunable optical filter can be accurately controlled and is less susceptible to vibration and mechanical failure. In addition, because the filter utilizes multiple EH gratings with different center wavelengths, the bandwidth of the filter can be extended beyond the bandwidth of any single EH grating.

An embodiment of a tunable optical filter includes multiple EH gratings with different center wavelengths. The EH gratings are optically connected such that an input optical signal can pass through at least one of the EH gratings. The EH gratings are activated to filter the input optical signal in response to an applied voltage.

In an embodiment, the EH gratings of the tunable optical filter are activated by electrode pairs that are associated with the EH gratings and the electrode pairs are controlled by a voltage controller. In an embodiment, EH gratings of the same center wavelength are controlled simultaneously by the voltage controller.

The tunable optical filter can be tuned over a range of wavelengths in response to adjustments in the applied voltage. In an embodiment, the tunable wavelength ranges of the EH gratings combine to form a continuous wavelength range that is greater than the wavelength range of any one EH grating.

Although the EH gratings are optically connected such that an input optical signal can pass through at least one of the EH gratings, typically, the EH gratings are optically connected such that an input optical signal can pass through at least two EH gratings having different center wavelengths in series. In an embodiment, a birefringent element can be used to split the input optical signal into two polarized beams to ensure polarization diverse filtering. When the input optical signal is split into two polarized beams, the EH gratings may include a first group of EH gratings having different center wavelengths that are optically connected such that the first polarized beam can pass through the first group of EH gratings and a second group of EH gratings having the same center wavelengths as the first group that are optically connected such that the second polarized beam can pass through the second group of EH gratings, with the first and second polarized beams passing through the respective groups of EH gratings in parallel.

In an embodiment, the EH gratings are formed in photorefractive crystals.

In another embodiment, the EH gratings of the tunable optical filter are included within a chirped grating.

Additional components of a tunable optical filter may include an input birefringent element, an input polarization rotator, an output birefringent element, and an output polarization rotator. The input birefringent element is located in an optical path that is before the EH gratings. The input birefringent element splits the input optical signal into first and second polarized beams having different polarization states before the input optical signal passes through the EH gratings. The input polarization rotator is located in an optical path that is between the input birefringent element and the EH gratings. The input polarization rotator brings the first and second polarized beams to the same polarization state. The output birefringent element is located in an optical path that is after the EH gratings. The output birefringent element combines the first and second polarized beams into an output signal after the first and second polarized beams have passed through the EH gratings. The output polarization rotator is located in an optical path that is between the EH gratings and the output birefringent element. The output polarization rotator brings the first and second polarized beams to different polarization states. In one arrangement of the filter, a first set of electroholographic filter elements (EFEs), which includes a first group of the EH gratings, are aligned to filter the first polarized beam and a second set of EFEs, which includes a second group of the EH gratings, are aligned to filter the second polarized beam.

Because some activated EH gratings cause the polarization state of a diffracted optical signal to be rotated, an embodiment of the tunable optical filter includes polarization rotators that are located between EH gratings of the same center wavelength to counteract the rotation that is caused by the activated EH gratings.

An embodiment of a method for filtering an optical signal that utilizes EH gratings involves passing an optical signal through a series of EH gratings with different center wavelengths, with the EH gratings being activated in response to an applied voltage, and selectively applying a voltage across at least one of the EH gratings to activate the at least one EH grating, thereby filtering the optical signal at a desired center wavelength. The filter can be fine tuned by adjusting the voltage that is applied across an activated EH grating. The filter can be coarse tuned by applying a voltage to a different one of the EH gratings. The filter can be tuned across a range of wavelengths by serially activating and tuning different sets of the EH gratings.

In an embodiment of the method, voltage is simultaneously applied across a set of EH gratings that have the same center wavelength.

In an embodiment of the method, the optical signal is split into two polarized beams before the optical signal is passed through the series of EH gratings and the polarization state of one of the beams is rotated such that the two polarized beams have the same polarization state before the two polarized beams are passed through the series of EH gratings. The two polarized beams are recombined after the beams have passed through the series of EH gratings.

Another embodiment of a tunable optical filter includes multiple EFEs that are optically aligned in a series of sets, such that an input optical signal can pass through each set of EFEs. Each set of EFEs includes EH gratings that have different wavelength ranges than the other sets of EFEs. Electrode pairs associated with each of the EFEs are used to activate the EH gratings within the EFEs and a voltage controller associated with the electrode pairs controls the application of voltage to the EFEs. The EH gratings within the EFEs can be tuned over their respective wavelength ranges by adjusting the applied voltage. A continuously tunable optical filter is formed by combining EFEs with overlapping wavelength ranges.

Other aspects and advantages of the present invention will become apparent from the following detailed description, taken in conjunction with the accompanying drawings, illustrating by way of example the principles of the invention.

DETAILED DESCRIPTION OF THE INVENTION

A tunable optical filter utilizes multiple electroholographic (EH) gratings with different center wavelengths to create a filter that can be tuned over a wide wavelength range. The EH gratings are connected such that an input optical signal can pass through at least one of the EH gratings. The EH gratings are activated and tuned by electrode pairs that are controlled through a voltage controller. The tunable optical filter is coarse tuned by activating the EH gratings having a wavelength range that includes the center wavelength that is to be filtered and fine tuned by adjusting the voltage that is applied across the activated EH gratings. Because the tunable optical filter is tuned simply by the application and adjustment of voltage across an EH grating, the tunable optical filter can be accurately controlled and is less susceptible to vibration and mechanical failure.

Figure 1:
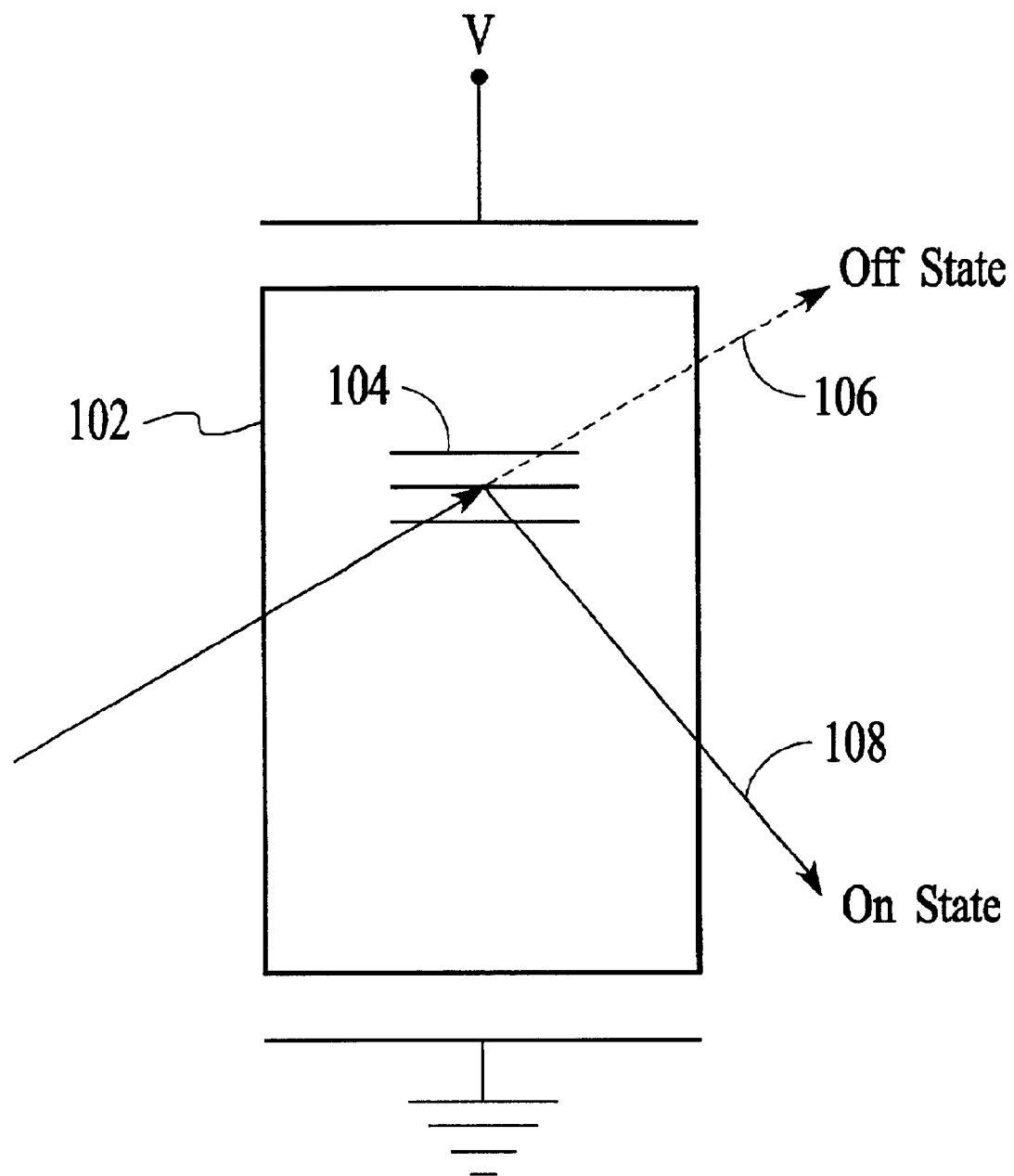
FIG. 1 depicts a photorefractive crystal with an electroholographic grating that is activated by applying a voltage with an electrode pair.
Figure 2:
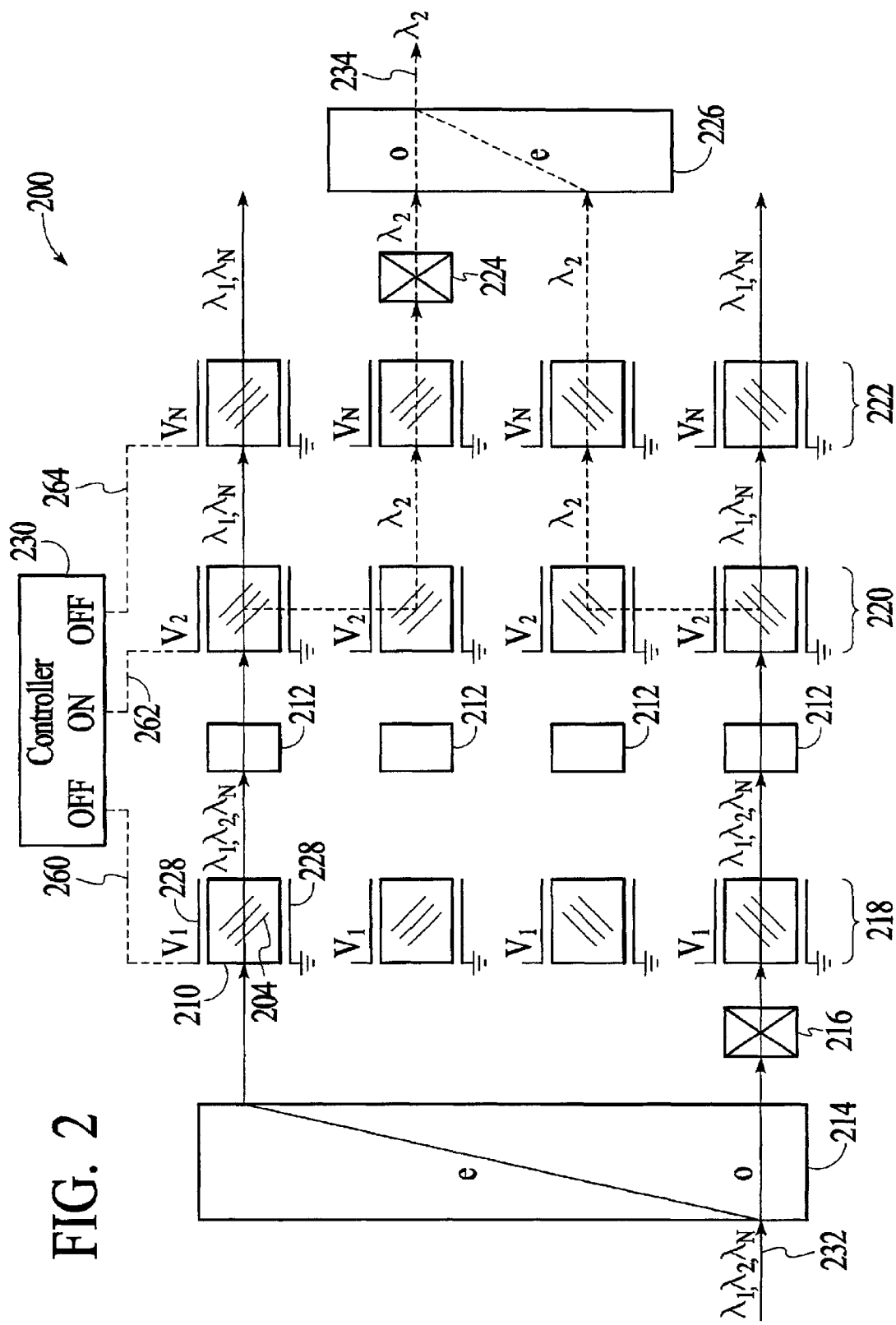
FIG. 2 depicts a tunable optical filter that utilizes a series of electroholographic filter elements (EFEs) in accordance with an embodiment of the invention.

FIG. 2 depicts an example of a tunable optical filter 200 that utilizes multiple electroholographic filter elements (EFEs) 210. The tunable optical filter includes an input birefringent element 214, an input polarization rotator 216, multiple sets of EFEs 218, 220, and 222, beam steerers 212, an output polarization rotator 224, an output birefringent element 226, electrode pairs 228 associated with each EFE, and a controller 230. The individual elements of the tunable optical filter are described first followed by a description of the operation of the filter and various alternative embodiments. It should be noted that throughout the description, similar reference numerals may be utilized to identify similar elements. Additionally, the term "optical" is not limited to the visible spectrum but includes other light spectrums, such as the infrared spectrum.

Referring to FIG. 2, the input birefringent element 214 receives an input optical signal 232 and divides the input optical signal into two polarized beams, referred to as the ordinary beam and the extraordinary beam ("o" and "e" beams). In an embodiment, the two beams are polarized orthogonally, for example, linear vertical and linear horizontal. A walk-off crystal that receives an input optical signal and outputs two polarized beams may be utilized as the input birefringent element. Birefringent elements are well known in the field of optics and are not described further. For example purposes, the input optical signal is a WDM signal that includes optical carriers at distinct wavelengths, identified as $\lambda_1$, $\lambda_2$, and $\lambda_N$.

The input polarization rotator 216 is located between the input birefringent element 214 and the first set of EFEs 218 along an optical path that includes one of the two polarized beams that is output from the input birefringent element. The input polarization rotator is utilized to ensure that the two polarized beams have the same polarization state before entering the EFEs. In the embodiment of FIG. 2, the polarization rotator receives the ordinary beam from the input birefringent element and rotates the polarization state of the beam by ninety degrees to match the polarization state of the other polarized beam. Both polarized beams are then input into the first set of EFEs 218. Although a single polarization rotator is used to ensure that the two beams have matching polarization states, other techniques known in the field of optics may be used.

The input optical signal 232 is transformed into two polarized beams having the same polarization state to ensure that the filtering process is accomplished irrespective of the polarization state of the incoming signal. The EFEs are polarization sensitive and therefore the entire optical signal must have the same polarization state to accomplish even filtering with similarly arranged EFEs.

The tunable optical filter 200 shown in FIG. 2 includes N (where N is an integer of one or greater) sets of EFEs 218, 220, and 222 that cover different portions of the tunable optical filter's total dynamic range. In the embodiment of FIG. 2, the EFEs 210 are formed of photorefractive crystals that include electroholographic (EH) gratings 204 written into the crystals. The EH gratings are written into the photorefractive crystals to have different center wavelengths (or frequencies). For applications that involve optical communications systems, the center wavelengths of the EH gratings are typically around the 980 nm and 1,500 nm wavelength ranges. In addition to the center wavelength characteristic of the EH gratings, the EH gratings have filtering bandwidths, which are set at the time of writing. Typically, the bandwidth of the EH gratings enables individual optical carriers to be filtered from a WDM signal. For example, the bandwidth of the EH gratings written into a photorefractive crystal around the 1,500 nm wavelength band may range from 0.5 nm to 2 nm. The function and performance of EH gratings in a photorefractive crystal are described by Aharon Agranat et al., in "Voltage-controlled photorefractive effect in paraelectric $KTa_{1-x}Nb_xO_3$:Cu, V", Optical Letters, vol. 14, No. 18, pp. 1017–1019 (1989), which is incorporated by reference herein.

In the example embodiment of FIG. 2, each set of EFEs 218, 220, and 222 includes two EFEs 210 dedicated to the upper optical path (i.e., the path the includes the "e" beam) and two EFEs dedicated to the lower optical path (i.e., the path that includes the "o" beam). Within each of the upper and lower optical paths, one of the two EFEs is aligned along an unfiltered optical path and the other of the two EFEs is aligned along a filtered optical path. In the embodiment of FIG. 2, and as is described in more detail below, the unfiltered optical paths are the paths of the undiffracted optical signals (the top and bottom paths of the tunable optical filter as depicted) and the filtered optical paths are the paths of the diffracted optical signals (the two middle optical paths as depicted). Activation of the EFEs and operation of the tunable optical filter is described in detail below. As depicted in FIG. 2, the sets of EFEs are aligned with each other, such that one EFE from each set of EFEs is aligned along the upper unfiltered optical path, one EFE from each set of EFEs is aligned along the upper filtered optical path, one EFE from each set of EFEs is aligned along the lower filtered optical path, and one EFE from each set of EFEs is aligned along the lower unfiltered optical path.

Figure 3A:
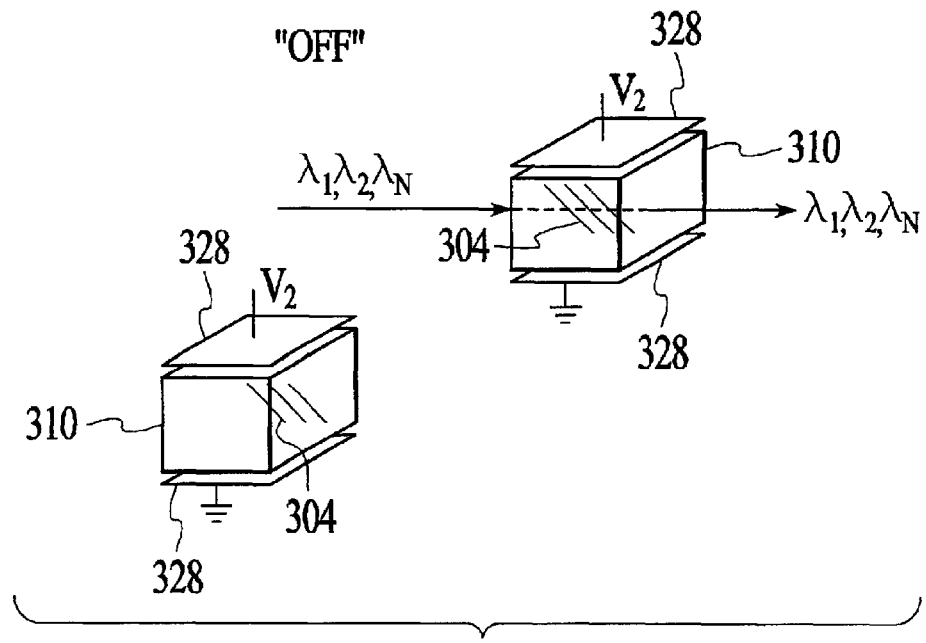
FIG. 3A depicts a pair of EFEs from FIG. 2 that are in the "off" state, that is, the EH gratings have not been activated.

The EH gratings 210 written into the photorefractive crystals are activated by applying an electric field to the EFEs as described above. FIG. 3A depicts a pair of EFEs, from the same set of EFEs, that are aligned such that an optical signal that is diffracted by the EH grating of one of the EFEs is incident on the EH gratings of the other EFE. In the example of FIG. 3A, the pair of EFEs are in the "off" state, that is, the EH gratings 304 have not been activated. In the off state, the EH gratings do not diffract the input optical signal and the input optical signal passes directly through the gratings of the EFE that is aligned with the unfiltered optical path. As shown in FIG. 3A, one of the two polarized beams described with reference to FIG. 2 passes through the EFE that is aligned with the unfiltered optical path without being diffracted by the EH gratings. Because the EH gratings are not active and do not diffract any portion of the polarized beam, no filtering takes place.

Figure 3B:
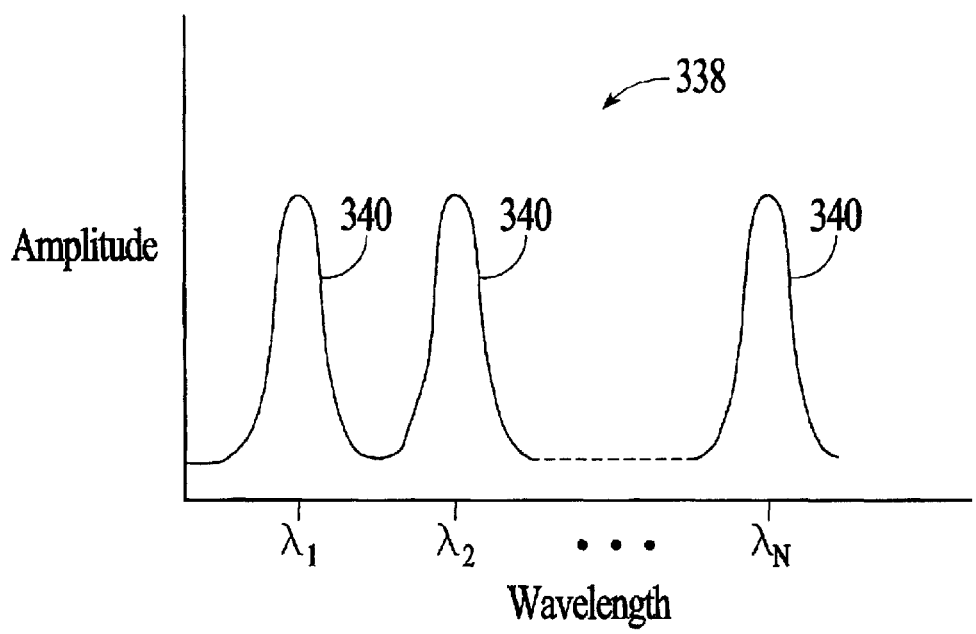
FIG. 3B depicts a WDM optical signal that is output from one of the EFEs of FIG. 3A when the EFEs are in the off state.

FIG. 3B depicts a WDM optical signal 338 that is output from the first EFE of FIG. 3A when the EFEs are in the off state. The WDM optical signal includes N different optical carriers 340, or channels, that are distributed across a range of wavelengths. Because no filtering takes place in the off state, the optical signal that is output from the EFE is the same as the optical signal that is input to the EFE.

Figure 4A:
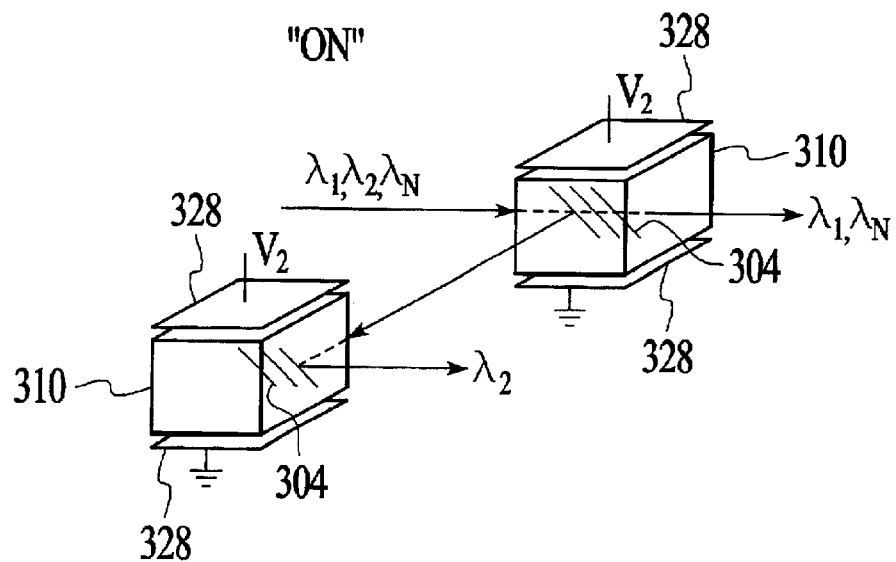
FIG. 4A depicts the pair of EFEs from FIG. 3A in the "on" state as opposed to the off state.

FIG. 4A depicts the pair of EFEs from FIG. 3A in the "on" state as opposed to the off state. In the on state, the EH gratings 306 diffract an optical signal at their pre-established center wavelength. As shown in FIG. 4A, the portion of the optical signal that is within the bandwidth of the EH gratings is diffracted by the first EH grating and is incident on the second EH grating. Because the second EH grating has the same characteristics as the first EH grating, the second EH grating diffracts the received optical signal. The diffracted optical signal, which now includes only portions of the original signal that are within the bandwidth of the EH grating, is referred to as the filtered signal. In the example of FIG. 4A, the filtered optical signal includes wavelength $\lambda_2$ and the unfiltered optical signal includes wavelengths $\lambda_1$ and $\lambda_N$. The filtered optical signal is output along the filtered optical path and the unfiltered optical signal is output along the unfiltered optical path.

Figure 4B:
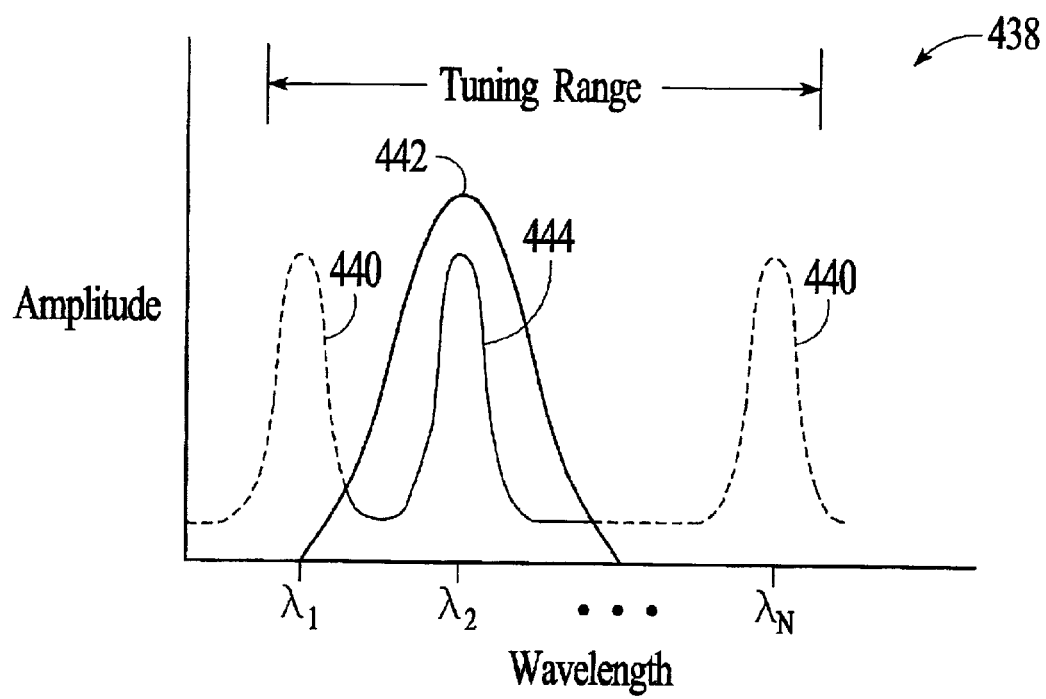
FIG. 4B depicts the WDM optical signal of FIG. 3B after the WDM optical signal has been filtered by the EFEs when the EFEs are in the on state.

FIG. 4B depicts the WDM optical signal 438 of FIG. 3B after the signal has been filtered by the EFE. The desired channel 444 ($\lambda_2$) is filtered from the rest of the optical signal, while the undesired portions of the optical signal, which include the other channels 440 ($\lambda_1$ and $\lambda_N$), are passed through the first EH grating and continue along the unfiltered optical path. As shown by the filter response curve 442 in FIG. 4B, the bandwidth of the EH gratings determines the resolution of each EFE. That is, if the bandwidth of the EH gratings is less than the channel spacing, then a single channel can be filtered, however if the bandwidth of the EH grating is greater than the channel spacing, then multiple channels will be simultaneously filtered by the EH gratings.

To use EH gratings in the tunable optical filter application that is depicted in FIG. 2, it is preferred that unfiltered and filtered optical signals follow separate optical paths. There are many orientations of EFEs and EH gratings that can be utilized to make the unfiltered and filtered optical signals follow separate optical paths and the particular orientation of the EFEs and EH gratings is not critical to the invention.

The center wavelengths of the EH gratings within an EFE are tuned by adjusting the voltage that is applied to the EH gratings. Referring to FIG. 4B, the tuning range of an EFE may include multiple channels of a WDM signal. For example, at a channel spacing of 2 nm and a tuning range of 7.5 nm, an EFE can be tuned across 3 channels.

Referring back to FIG. 2 the beam steerers are located between the first and second sets of EFEs 218 and 220. The beam steerers are used to control the angle of incidence of the filtered and unfiltered beams. The beam steerers may include photorefractive crystals. The beam may be located between different sets of EFEs and more beam steerers may be added as necessary.

The output polarization rotator 224 is located between the third set of EFEs 222 and the output birefringent element 226 along an optical path that includes one of the two filtered beams that is output from the third set of EFEs. The output polarization rotator is utilized to return the filtered optical signal to its original polarization state before the optical signal 232 was split by the input birefringent element 214 and rotated by the input polarization rotator 216, thereby causing polarization independent transmission of light through the tunable optical filter. In the embodiment of FIG. 2, the output polarization rotator is a half-wave plate that rotates the polarization state of the received beam by ninety degrees. In the embodiment of FIG. 2, the output polarization rotator receives the extraordinary beam from the filtered upper optical path and rotates the polarization state of the beam by ninety degrees so that the polarization states of the upper and lower beams are orthogonal. Both polarized beams are then input into the output birefringent element. Although a single polarization rotator is used to ensure that the two beams have orthogonal polarization states, other techniques known in the field of optics may be used.

The output birefringent element 226 receives the two orthogonally polarized beams and combines the beams into a single output optical signal. In an embodiment, the two orthogonally polarized beams are polarized linear vertical and linear horizontal. A walk-off crystal that receives the two orthogonally polarized beams and outputs a combined optical signal may be utilized as the output birefringent element.

In the embodiment of FIG. 2, all of the EFEs in a set are controlled simultaneously through common control links between the controller and the respective electrode pairs. In the embodiment of FIG. 2, common control link 260 controls the first set of EFEs 218, common control link 262 controls the second set of EFEs 220, and common control link 264 controls the third set of EFEs 222. The electrode pairs 228 associated with each EFE provide activation voltage to the EFEs in response to signals from the voltage controller 230.

The controller 230 centrally controls the activation and tuning of the EFEs 210. The controller can dynamically adjust which set of EFEs is activated and can tune the activated EFEs through the common control links and electrode pairs. The controller coarse tunes the optical filter by activating a particular set of EFEs having a wavelength range that includes the center wavelength that is to be filtered and fine tunes the optical filter by adjusting the voltage to the activated set of EFEs to diffract a specific center wavelength that is within the wavelength range of the activated EFEs. Filtering across a range of wavelengths that includes more that one set of EFEs involves serially activating and tuning the EFE sets that correspond to the wavelength range. In an example application, the tunable optical filter is used as a pre-selector filter in an optical spectrum analyzer (OSA) that utilizes a swept local oscillator signal. When used as a pre-selector, the controller serially activates and tunes the EFE sets to track the wavelength change of the swept local oscillator signal.

In operation, referring to FIG. 2, the input optical signal 232, for example the WDM signal including $\lambda_1$, $\lambda_2$, and $\lambda_N$, is input into the input birefringent element 214. The input optical signal is divided into two polarized beams and the two polarized beams are output from the input birefringent element. The polarization state of one of the two polarized beams is then rotated by the input polarization rotator 216 to match the polarization state of the other polarized beam. The two beams, having the same polarization state, enter the first set of EFEs 218 at the EFEs that are aligned with the unfiltered optical paths (i.e., the top and bottom of optical paths). In the example of FIG. 2, the tunable optical filter 200 is coarse tuned such that the first and $N^{th}$ set of EFEs 218 and 222 in the series of EFEs are turned "off" and the second set of EFEs 220 in the series is turned "on." Because the first set of EFEs is turned off, the two polarized beams pass through the EH gratings 204 that are along the optical path of the two polarized beams without being diffracted from their initial optical paths. The solid lines within the first EFEs indicate the optical paths of the beams within the first EFEs. It should be noted that even if an EFE is turned "on," optical signals that are not at the center wavelength of the activated EH grating will pass through the EFE basically undiffracted.

Upon exiting the first set of EFEs 218 in the series, the two polarized beams pass through the beam steerers 212 and enter the second set of EFEs 220 in the series. Because the second set of EFEs is turned on, the EH gratings 204 are activated and the two polarized beams are filtered by the EH gratings. That is, a specific wavelength band is diffracted by the activated EH gratings while the surrounding wavelength bands are passed through the activated EH gratings to the next set of EFEs along the unfiltered optical path. For example, the EH gratings within the second set of EFEs diffract a single optical carrier (i.e., $\lambda_2$) while allowing the other carriers (i.e., $\lambda_1, \lambda_N$) to pass undiffracted. The dashed lines that originate within the second set of EFEs indicate the optical paths of the filtered beams within the tunable optical filter. The solid lines indicate the optical paths of the unfiltered beams within the tunable filter. As described above, the center wavelength of the EH gratings within the activated EFEs can be tuned by adjusting the voltage that is applied to the EFEs.

Upon exiting the second set of EFEs 220 in the series, the unfiltered and filtered optical beams enter the $N^{th}$ set of EFEs 222 in the series. Because the $N^{th}$ set of EFEs is turned off, the filtered and unfiltered beams pass through the EH gratings 204 without being diffracted from their optical paths. The dashed lines exiting the $N^{th}$ set of EFEs represent the optical signals that were diffracted by the second set of EFEs and the solid lines exiting the $N^{th}$ set of EFEs represent the optical signals that were not diffracted by the second set of EFEs.

Upon exiting the $N^{th}$, and last, set of EFEs 222 in the series, one of the diffracted optical signals enters the output polarization rotator 224. In the embodiment of FIG. 2, the output polarization rotator rotates the polarization state of the received beam by ninety degrees so that the two diffracted beams have orthogonal polarization states. Once the polarization states of the two diffracted beams are orthogonal, the beams are combined in the output birefringent element 226 and a filtered optical signal 234 is output. The filtered optical signal reflects the characteristics of the activated EH gratings in the second set of EFEs (i.e., $\lambda_2$). The filtered optical signal can be output to an optical detector or an intermediate optical component.

Figures 5, 6:
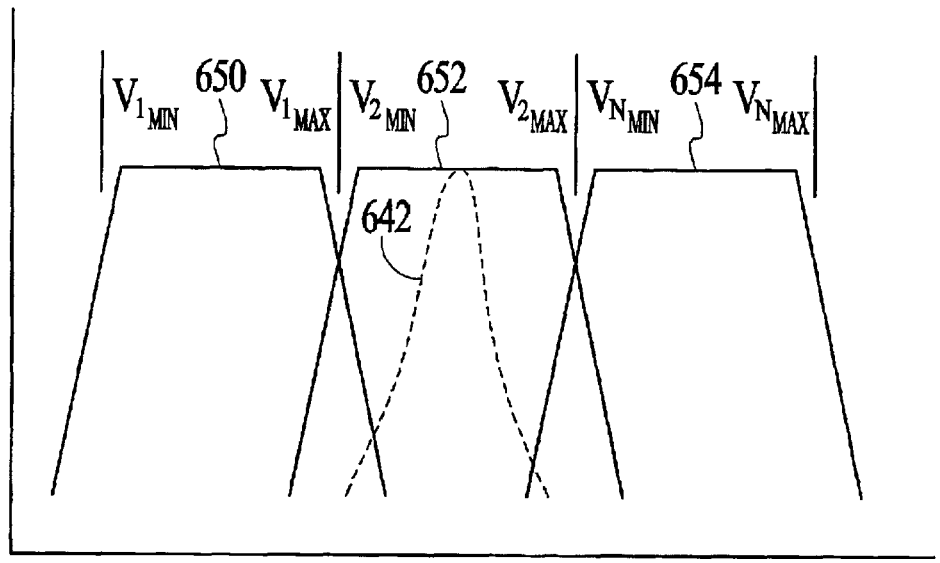
FIG. 5 depicts a partial control matrix for the tunable optical filter of FIG. 2.
FIG. 6 depicts an example of the frequency response of the three EFEs from FIG. 2, with the three EFEs covering separate, but continuous, wavelength ranges in accordance with an embodiment of the invention.

FIG. 5 depicts a partial control matrix for the tunable optical filter of FIG. 2. The control matrix includes the controller state for each of the common control links 260, 262, and 264 and the resulting wavelength output of the tunable optical filter. For example, if none of the sets of EFEs are activated, then no wavelengths are output from the tunable optical filter and if the second set of EFEs is activated, then wavelength $\lambda_2$ is output from the tunable optical filter. By individually controlling the sets of EFEs, many different wavelength combinations can be output from the tunable optical filter.

In an embodiment, wavelength ranges of the individual EFEs combine to form a continuous wavelength range that is larger than the wavelength range of any one of the EFEs. FIG. 6 depicts an example of the frequency responses 650, 652, and 654 of the three sets of EFEs 218, 220, and 222 from FIG. 2. As shown in FIG. 6, the three sets of EFEs are capable of filtering separate, but continuous, wavelength ranges. In the embodiment of FIG. 6, the low end of each wavelength range is achieved by applying a minimum voltage, $V_{min}$, to the respective set of EFEs and the high end of each wavelength range is achieved by applying a maximum voltage, $V_{max}$, to the respective set of EFEs, where $V_{min}$ and $V_{max}$, are specific to each set of EFEs. Although FIG. 6 depicts three individual wavelength ranges that are combined to form a continuous wavelength range, a tunable optical filter may alternatively include a non-continuous wavelength range or may include more than three different wavelength ranges. FIG. 6 also depicts an example of the filter response curve 642 of the second set of EFEs relative to the wavelength range of the EFEs and the combined wavelength range of all of the EFEs.

Figure 7:
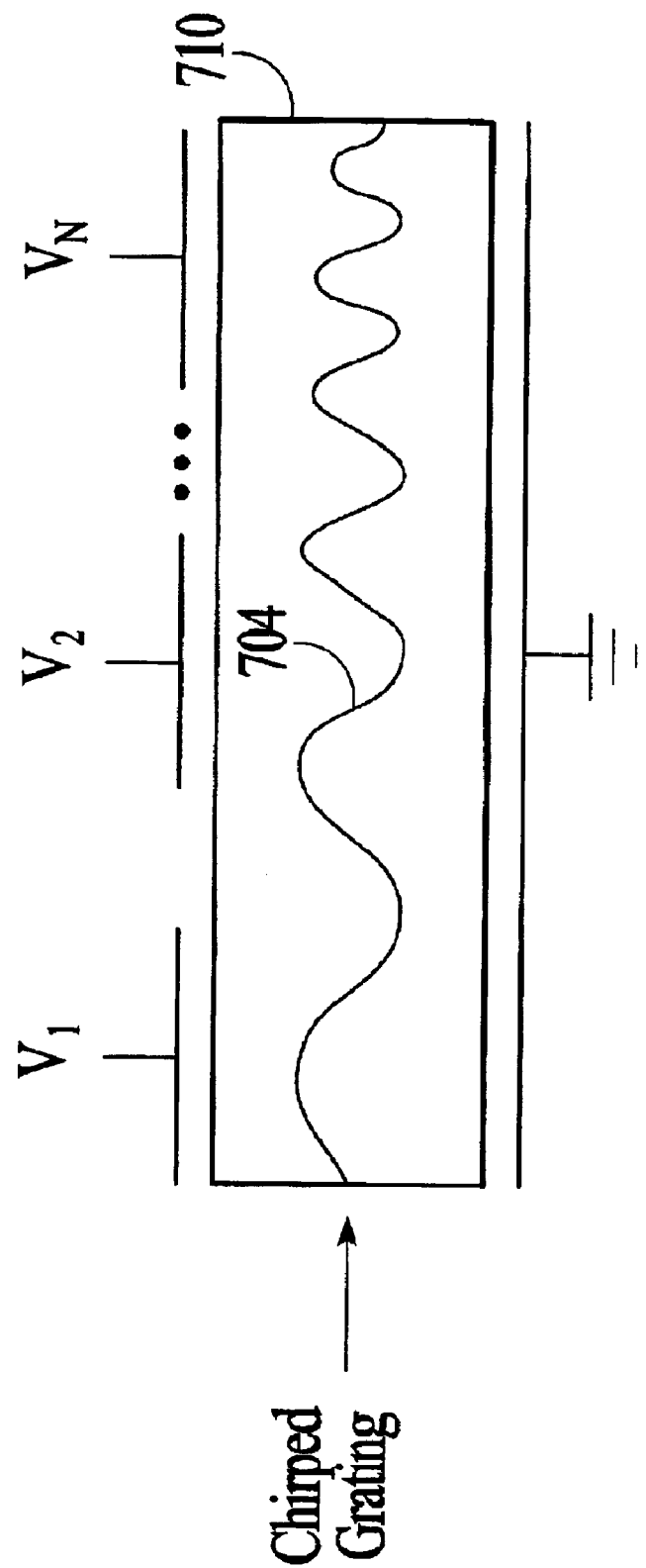
FIG. 7 depicts an EFE that includes a chirped EH grating that can be activated to filter an incoming optical signal at different center wavelengths.

FIG. 7 depicts an alternative embodiment to the arrangement of EFEs and EH gratings depicted in FIG. 2. In the embodiment of FIG. 7, all of the EH gratings along a similar optical path can be combined into a single EFE that includes a chirped EH grating written into the photorefractive crystal. The chirped EH grating can be activated at different center wavelengths by applying different voltages across the EFE. For example, specific activation voltages can be applied by voltage specific electrodes Although the tunable optical filter described with reference to FIG. 2 includes three sets of EFEs, it should be understood that a tunable optical filter with a different number of EFE sets may be implemented in accordance with the invention. Additional EFE sets can be added to expand the overall wavelength range of the tunable optical filter.

Although the EFEs are described as single-crystal EFEs, the EFEs may be formed of multiple crystals, for example, crystal pairs. In addition, although all of the EFEs depicted in FIG. 2 are formed of separate crystals, multiple EH gratings may be formed in single crystal.

Figure 8:
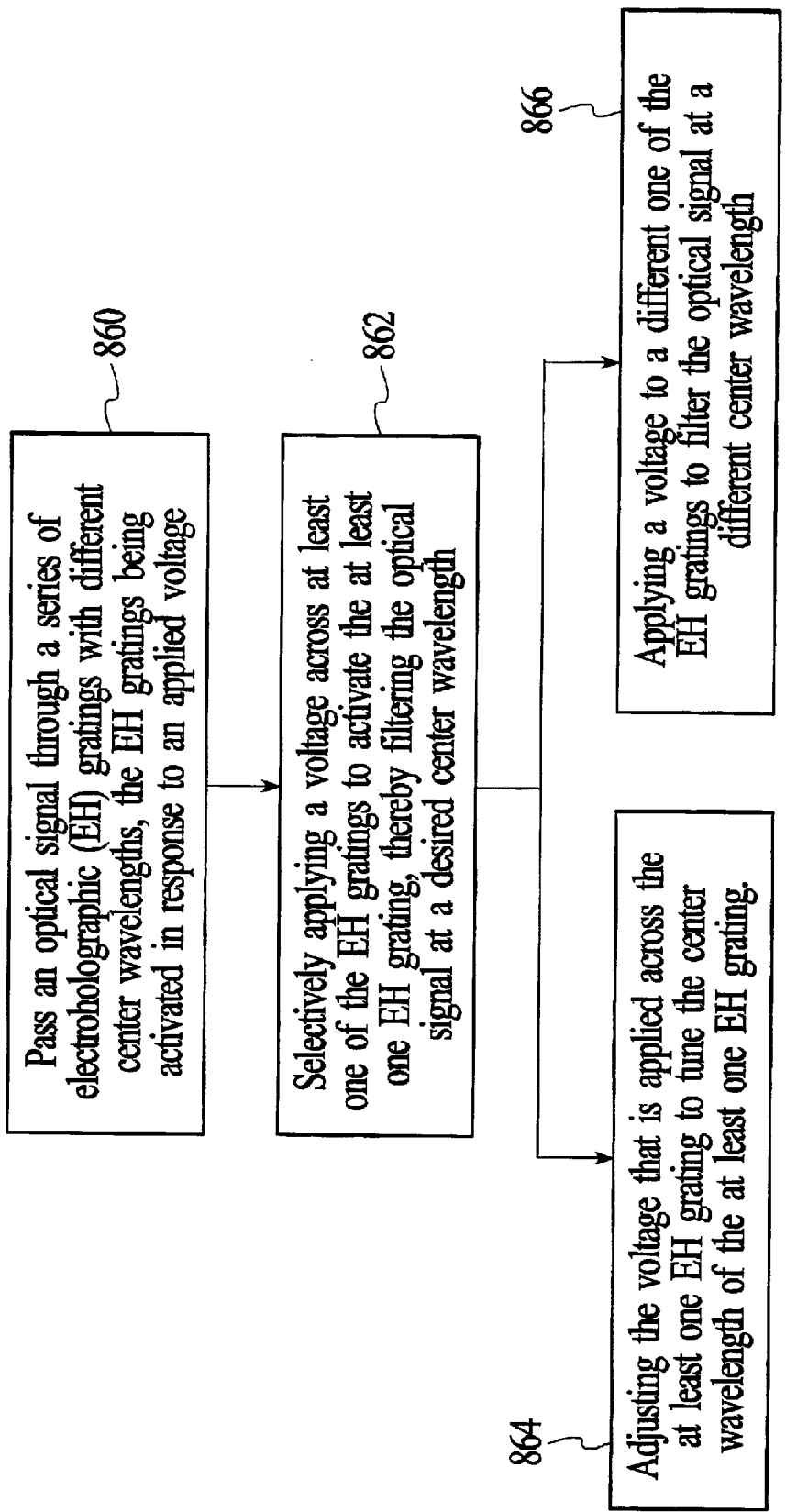
FIG. 8 is a process flow diagram of a method for filtering an optical signal in accordance with an embodiment of the invention.

FIG. 8 depicts a process flow diagram of a method for filtering an optical signal that is similar to the technique described above with reference to FIGS. 1–7. At step 860, an optical signal is passed through a series of EH gratings with different center wavelengths, the EH gratings being activated in response to an applied voltage. At step 862, a voltage is selectively applied across at least one of the EH gratings to activate the at least one EH grating, thereby filtering the optical signal at a desired center wavelength. The filter can be fine tuned by adjusting the voltage that is applied across the at least one EH grating to tune the center wavelength of the at least one EH grating, step 864. The filter can be coarse tuned by applying a voltage to a different one of the EH gratings to filter the optical signal at a different center wavelength, step 866.

In some types of EFEs, an activated EH grating causes the polarization state of the diffracted optical signal to be rotated while the polarization state of signals that pass through the EH grating without being diffracted remains unchanged. The polarization state of undiffracted signals remains unchanged whether or not an EH grating is activated as long as the signal is outside the bandwidth of the EH grating. Typically, the polarization state of a diffracted optical signal is rotated by ninety degrees by an activated EH grating.

Figure 9:
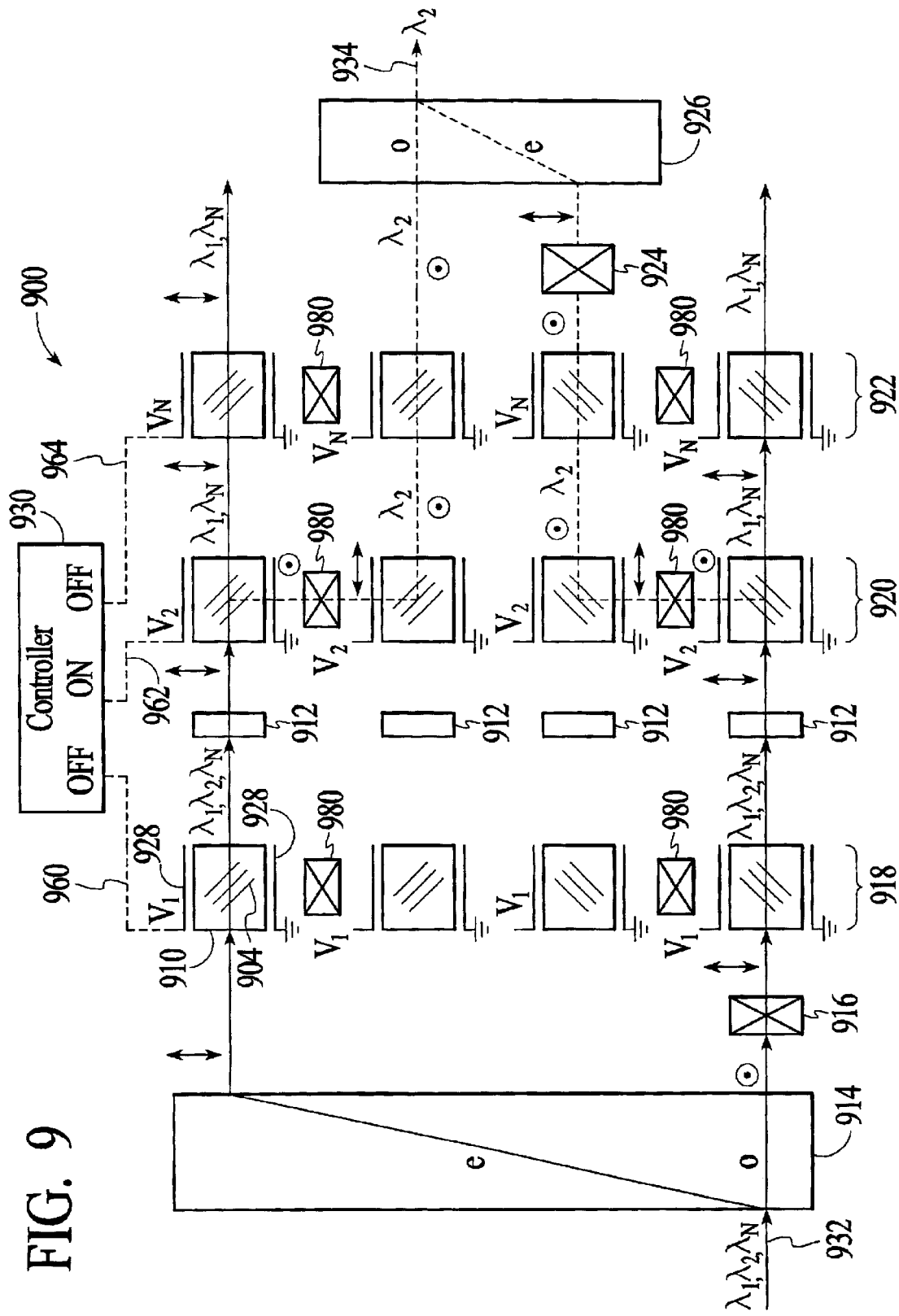
FIG. 9 depicts a tunable optical filter that utilizes a series of EFEs and polarization rotators that are located between EFEs of the same center wavelength.

To compensate for the polarization rotation that is caused by some types of EFEs, the tunable optical filter described with reference to FIG. 2 is modified. FIG. 9 depicts an embodiment of a tunable optical filter with multiple EH gratings that includes polarization rotators 980 that have been strategically located between EFEs of the same center wavelength to manipulate the polarization state of the optical signals to ensure a polarization diverse response. The tunable optical filter depicted in FIG. 9 is similar to the tunable optical filter depicted in FIG. 2 except that the tunable optical filter depicted in FIG. 9 includes additional half-wave plates that are located between EFEs of the same center wavelength. In addition, the output polarization rotator has been relocated to account for the polarization changes that are caused by the activated EH gratings and the additional half-wave plates.

In operation, referring to FIG. 9, the input optical signal 932, for example the WDM signal including $\lambda_1$, $\lambda_2$, and $\lambda_N$, is input into the input birefringent element 914. The input optical signal is divided into two polarized beams and the two polarized beams are output from the input birefringent element. The polarization state of one of the two polarized beams is then rotated by the input polarization rotator 916 to match the polarization state of the other polarized beam. For example, the polarization state may be rotated from linear horizontal to linear vertical. The two beams, having the same polarization state, enter the first set of EFEs 918 at the EFEs that are aligned with the unfiltered optical paths (i.e., the top and bottom of optical paths). In the example of FIG. 9, the tunable optical filter 900 is coarse tuned such that the first and $N^{th}$ set of EFEs 918 and 922 in the series of EFEs are turned "off" and the second set of EFEs 920 in the series is turned "on." Because the first set of EFEs is turned off, the two polarized beams pass through the EH gratings 904 that are along the optical path of the two polarized beams without being diffracted from their initial optical paths and without having their polarization states rotated. The solid lines within the first EFEs indicate the optical paths of the beams within the first EFEs. It should be noted that even if an EFE is turned "on," optical signals that are not at the center wavelength of the activated EH grating will pass through the EFE basically undiffracted and without polarization rotation.

Upon exiting the first set of EFEs 918 in the series, the two polarized beams pass through the beam steerers 912 and enter the second set of EFEs 920 in the series. Because the second set of EFEs is turned on, the EH gratings 904 are activated and the two polarized beams are filtered by the EH gratings. That is, a specific wavelength band is diffracted by the activated EH gratings while the surrounding wavelength bands are passed through the activated EH gratings to the next set of EFEs along the unfiltered optical path. For example, the EH gratings within the second set of EFEs diffract a single optical carrier (i.e., $\lambda_2$) while allowing the other carriers (i.e., $\lambda_1$, $\lambda_N$) to pass undiffracted. The dashed lines that originate within the second set of EFEs indicate the optical paths of the filtered beams within the tunable optical filter. The solid lines indicate the optical paths of the unfiltered beams within the tunable filter. As described above, the center wavelength of the EH gratings within the activated EFEs can be tuned by adjusting the voltage that is applied to the EFEs.

In addition to being diffracted, the polarization state of the diffracted optical signals is also rotated by ninety degrees (i.e., from linear vertical to linear horizontal) by the activated EH gratings. To account for the polarization rotation of the diffracted signals, the additional half-wave plates 980 that are located between the EFEs 910 rotate the polarization state of the diffracted signals by another ninety degrees (i.e., from linear horizontal to linear vertical). The diffracted and rotated signals are then incident on the next EFEs along the filtered paths and the polarization state of the signals are rotated again as a result of the activated EH gratings. For example, the polarization state of the signals is rotated from linear vertical to linear horizontal.

Upon exiting the second set of EFEs 920 in the series, the unfiltered and filtered optical beams enter the $N^{th}$ set of EFEs 922 in the series. Because the $N^{th}$ set of EFEs is turned off, the filtered and unfiltered beams pass through the EH gratings 904 without being diffracted from their optical paths and without polarization rotation. The dashed lines exiting the $N^{th}$ set of EFEs represent the optical signals that were diffracted by the second set of EFEs and the solid lines exiting the $N^{th}$ set of EFEs represent the optical signals that were not diffracted by the second set of EFEs.

Upon exiting the $N^{th}$, and last, set of EFEs 922 in the series, one of the diffracted optical signals enters the output polarization rotator 924. In the embodiment of FIG. 9, the output polarization rotator rotates the polarization state of the received beam by ninety degrees (i.e., from linear horizontal to linear vertical) so that the two diffracted beams have orthogonal polarization states. Once the polarization states of the two diffracted beams are orthogonal, the beams are combined in the output birefringent element 926 and a filtered optical signal 934 is output. The filtered optical signal reflects the characteristics of the activated EH gratings in the second set of EFEs (i.e., $\lambda_2$). The filtered optical signal can be output to an optical detector or an intermediate optical component.

Although specific embodiments of the invention have been described and illustrated, the invention is not limited to the specific forms and arrangements of parts so described and illustrated. The invention is limited only by the claims.

What is claimed is:

1. A tunable optical filter comprising:
a plurality of electroholographic (EH) gratings, said EH gratings being optically connected such that an input optical signal can pass through at least one of said plurality of EH gratings, wherein said EH gratings are activated to filter said input optical signal in response to an applied voltage, said plurality of EH gratings including EH gratings with different center wavelengths and EH gratings with the same center wavelengths.

2. The tunable optical filter of claim 1 further including:
electrode pairs associated with said EH gratings for applying voltage across EH gratings of a desired center wavelength to activate said EH gratings with said desired center wavelength; and
a voltage controller associated with said electrode pairs for controlling the application of voltage across said EH gratings by the respective electrode pairs.

3. The tunable optical filter of claim 2 wherein EH gratings of the same center wavelength are controlled simultaneously by said voltage controller.

4. The tunable optical filter of claim 1 wherein said EH gratings are tunable over a range of wavelengths in response to adjustments in the applied voltage.

5. The tunable optical filter of claim 4 wherein the tunable wavelength ranges of said EH gratings combine to form a continuously tunable wavelength range.

6. The tunable optical filter of claim 1 wherein at least two of said EH gratings having different center wavelengths are optically connected such that an input signal can pass through said at least two EH gratings in series.

7. The tunable optical filter of claim 1 further including:
an input birefringent element, located in an optical path that is before said plurality of EH gratings, for splitting said input optical signal into first and second polarized beams having different polarization states before said input optical signal passes through said plurality of EH gratings;
wherein said plurality of EH gratings includes a first group of EH gratings having different center wavelengths that are optically connected such that said first polarized beam can pass through said first group of EH gratings and a second group of EH gratings having the same center wavelengths as said first group of EH gratings that are optically connected such that said second polarized beam can pass through said second group of EH gratings, said first and second polarized beams passing through the respective groups of EH gratings in parallel.

8. The tunable optical filter of claim 1 wherein said EH gratings are formed in photorefractive crystals.

9. The tunable optical filter of claim 1 wherein said plurality of EH gratings are formed as a chirped EH grating that can be activated at different center wavelengths by applying different voltages across said chirped EH grating.

10. The tunable optical filter of claim 1 further including:
an input birefringent element, located in an optical path that is before said plurality of EH gratings, for splitting said input optical signal into first and second polarized beams having different polarization states before said input optical signal passes through said plurality of EH gratings;
an input polarization rotator, located in an optical path that is between said input birefringent element and said plurality of EH gratings, for bringing said first and second polarized beams to the same polarization state;
an output birefringent element, located in an optical path that is after said plurality of EH gratings, for combining said first and second polarized beams into an output signal after said first and second polarized beams have passed through said plurality of EH gratings; and
an output polarization rotator, located in an optical path that is between said plurality of EH gratings and said output birefringent element, for bringing said first and second polarized beams to different polarization states.

11. The tunable optical filter of claim 10 wherein a first set of electroholographic filter elements (EFEs), which includes a first group of said EH gratings, are aligned to filter said first polarized beam and a second set of EFEs, which includes a second group of said EH gratings are aligned to filter said second polarized beam.

12. The tunable optical filter of claim 10 wherein said input polarization rotator includes a half-wave plate that rotates the polarization state of one of said first and second polarized beams by ninety degrees.

13. The tunable optical filter of claim 10 wherein said output polarization rotator includes a half-wave plate that rotates the polarization state of one of said first and second polarized beams by ninety degrees.

14. The tunable optical filter of claim 1 further including polarization rotators located between EH gratings that have the same center wavelength.

15. A tunable optical filter comprising:
a plurality of electroholographic (EH) gratings, said EH gratings being optically connected such that an input optical signal can pass through at least one of said plurality of EH gratings, wherein said EH gratings are activated to filter said input optical signal in response to an applied voltage; and
an input birefringent element, located in an optical path that is before said plurality of EH gratings, for splitting said input optical signal into first and second polarized beams having different polarization states before said input optical signal passes through said plurality of EH gratings;
wherein said plurality of EH gratings includes a first group of EH gratings having different center wavelengths that are optically connected such that said first polarized beam can pass through said first group of EH gratings and a second group of EH gratings having the same center wavelengths as said first group of EH gratings that are optically connected such that said second polarized beam can pass through said second group of EH gratings, said first and second polarized beams passing through the respective groups of EH gratings in parallel.

16. A tunable optical filter comprising:
a plurality of electroholographic (EH) gratings with different center wavelengths, said EH gratings being optically connected such that an input optical signal can pass through at least one of said plurality of EH gratings, wherein said EH gratings are activated to filter said input optical signal in response to an applied voltage;
wherein said plurality of EH gratings are formed as a chirped EH grating that can be activated at different center wavelengths by applying different voltages across said chirped EH grating.

17. A tunable optical filter comprising:
a plurality of electroholographic (EH) gratings, said EH gratings being optically connected such that an input optical signal can pass through at least one of said plurality of EH gratings, wherein said EH gratings are activated to filter said input optical signal in response to an applied voltage, said plurality of EH gratings including EH gratings with different center wavelengths and EH gratings with the same center wavelengths; and
polarization rotators located between EH gratings that have the same center wavelength.

* * * * *